US012640673B2

(12) United States Patent (10) Patent No.: US 12,640,673 B2
Yamaguchi et al. (45) Date of Patent: May 26, 2026

(54) ELECTRIC MACHINE SYSTEM

(71) Applicant: IHI Corporation, Tokyo (JP)

(72) Inventors: Koji Yamaguchi, Tokyo (JP); Kenshiro Katsura, Tokyo (JP); Takuya Shimotsu, Tokyo (JP); Satoshi Yazaki, Tokyo (JP)

( * ) Notice: Subject to any disclaimer, the term of this patent is extended or adjusted under 35 U.S.C. 154(b) by 131 days.

(21) Appl. No.: 18/407,516

(22) Filed: Jan. 9, 2024

(65) Prior Publication Data

US 2024/0146223 A1 May 2, 2024

Related U.S. Application Data

(63) Continuation of application No. PCT/JP2022/033137, filed on Sep. 2, 2022.

(30) Foreign Application Priority Data

Sep. 22, 2021 (JP) ................................. 2021-153869

(51) Int. Cl.
*H02P 21/22* (2016.01)
*H02K 11/25* (2016.01)
(Continued)

(52) U.S. Cl.
CPC .............. *H02P 21/22* (2016.02); *H02K 11/25* (2016.01); *H02K 11/27* (2016.01); *H02P 21/10* (2013.01)

(58) Field of Classification Search
CPC .............. H02P 3/06; H02P 29/00; H02P 7/00
See application file for complete search history.

(56) References Cited

U.S. PATENT DOCUMENTS

2003/0030339 A1 2/2003 Dombrovski
2010/0109586 A1* 5/2010 Matsui .................. B60L 15/025
318/400.04
(Continued)

FOREIGN PATENT DOCUMENTS

JP 2009-247077 10/2009
JP 2010-022185 1/2010
(Continued)

OTHER PUBLICATIONS

Extended Search Report in corresponding European Application No. 22872677.4 dated May 23, 2025.
(Continued)

*Primary Examiner* — Said Bouziane
(74) *Attorney, Agent, or Firm* — SHIPWAY IP

(57) ABSTRACT

The electric machine system includes an electric machine having a rotor and a coil; the power converter that outputs an output current to the coil of the electric machine; and a controller that controls the power converter. The controller includes a signal output unit that outputs a signal for controlling a mode of the output current to the power converter; and an abnormality detection unit that receives an abnormality signal indicating an abnormal situation. The signal output unit outputs a demagnetization control signal to the power converter when the abnormality detection unit receives the abnormality signal. The power converter causes a demagnetization current for a demagnetization magnetic flux that demagnetizes the permanent magnet of the rotor to flow through the coil in response to an input of the demagnetization control signal.

12 Claims, 8 Drawing Sheets

(51) Int. Cl.
    *H02K 11/27*        (2016.01)
    *H02P 21/10*        (2016.01)

(56)               References Cited

U.S. PATENT DOCUMENTS

| | | | |
|---|---|---|---|
| 2010/0176679 | A1 | 7/2010 | Ichiyama |
| 2011/0260748 | A1* | 10/2011 | Lee ..................... H02P 25/024 |
| | | | 324/765.01 |
| 2011/0304235 | A1 | 12/2011 | Hashiba et al. |
| 2014/0062362 | A1 | 3/2014 | Kawai |
| 2014/0283372 | A1 | 9/2014 | Hashiba et al. |
| 2014/0283374 | A1 | 9/2014 | Hashiba et al. |
| 2014/0285051 | A1 | 9/2014 | Hashiba et al. |
| 2020/0001913 | A1 | 1/2020 | Kim |

FOREIGN PATENT DOCUMENTS

| | | |
|---|---|---|
| JP | 2010-148180 | 7/2010 |
| JP | 2010-233438 | 10/2010 |
| JP | 2014-117013 | 6/2014 |
| JP | 2017-112680 | 6/2017 |
| WO | 2016/189671 | 12/2016 |

OTHER PUBLICATIONS

International Search Report dated Nov. 15, 2022 for PCT/JP2022/033137.
International Preliminary Report on Patentability with Written Opinion dated Apr. 4, 2024 for PCT/JP2022/033137.

* cited by examiner

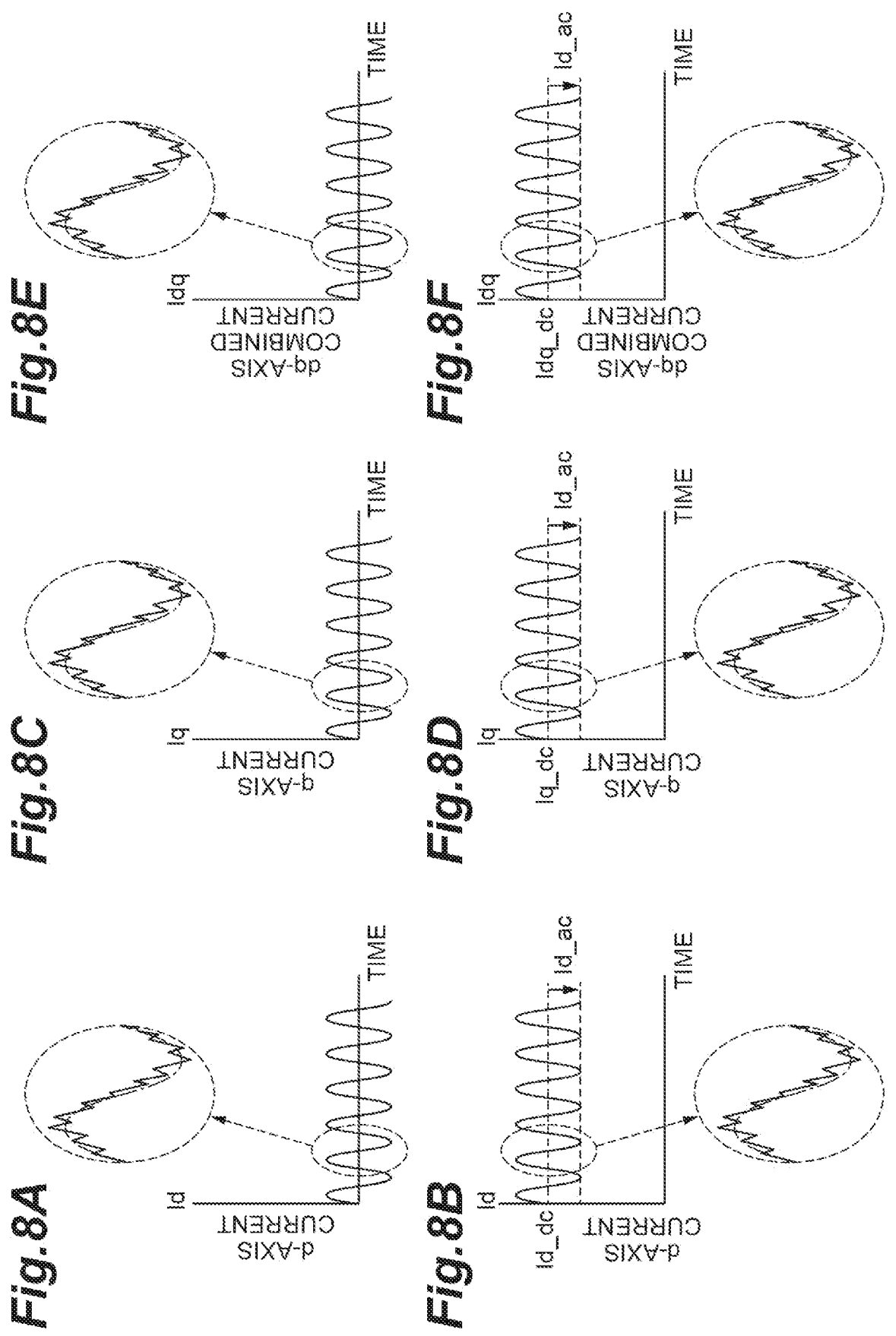

ELECTRIC MACHINE SYSTEM

CROSS-REFERENCE TO RELATED APPLICATION

This application is a continuation application of PCT Application No. PCT/JP2022/033137, filed Sep. 2, 2022, which claims the benefit of priority from Japanese Patent Application No. 2021-153869 filed on Sep. 22, 2021. The entire contents of the above listed PCT and priority applications are incorporated herein by reference.

BACKGROUND

The present disclosure relates to an electric machine system.

Japanese Unexamined Patent Publication No. 2010-022185, Japanese Unexamined Patent Publication No. 2010-148180 and Japanese Unexamined Patent Publication No. 2010-233438 disclose techniques related to electric machines such as an electric motor and a generator including a coil and a magnet. Japanese Unexamined Patent Publication No. 2010-022185 discloses an efficient slip-free synchronous motor. Japanese Unexamined Patent Publication No. 2010-148180 discloses a technique that suppresses an increase in magnetization current at the time of demagnetization and at the time of magnetization, and enables variable speed operation in a wide range from low speed to high speed with high output. Japanese Unexamined Patent Publication No. 2010-233438 discloses an energy efficient magnetic flux variable rotating electric machine system.

When a rotor including a magnet rotates with respect to a stator including a coil, a voltage is generated in the coil. As for the induced voltage induced in the coil, for example, even when an abnormality such as a short circuit failure occurs in a circuit such as the coil, the induced voltage continues to be generated as the rotating operation continues. The fault current flowing when such an abnormality occurs causes an unintended failure. Therefore, the electric machine may cope with a fault current.

The present disclosure describes an electric machine system which may reduce the magnitude of a fault current.

SUMMARY

An electric machine system of the present disclosure includes an electric machine including a rotor that includes a magnet and rotates together with a shaft, and a coil fixedly disposed to surround the rotor; a power converter that outputs an output current to the coil of the electric machine; and a controller that controls the power converter. The controller includes a signal output unit that outputs a signal for controlling a mode of the output current to the power converter, and an abnormality detection unit that receives an abnormality signal indicating an abnormal situation. The signal output unit outputs a demagnetization control signal to the power converter when the abnormality detection unit receives the abnormality signal. The power converter causes a demagnetization current for a demagnetization magnetic flux for demagnetizing the magnet of the rotor to flow through the coil in response to an input of the demagnetization control signal.

The electric machine system of the present disclosure may reduce the magnitude of the fault current.

BRIEF DESCRIPTION OF THE DRAWINGS

FIGS. 8A and 8B are other diagrams illustrating the current provided from the power converter to the electric machine in the electric machine system. FIGS. 8C, 8D, 8E, and 8F are other diagrams illustrating modification examples of the current provided from the power converter to the electric machine in the electric machine system.

DETAILED DESCRIPTION

Figure 1:
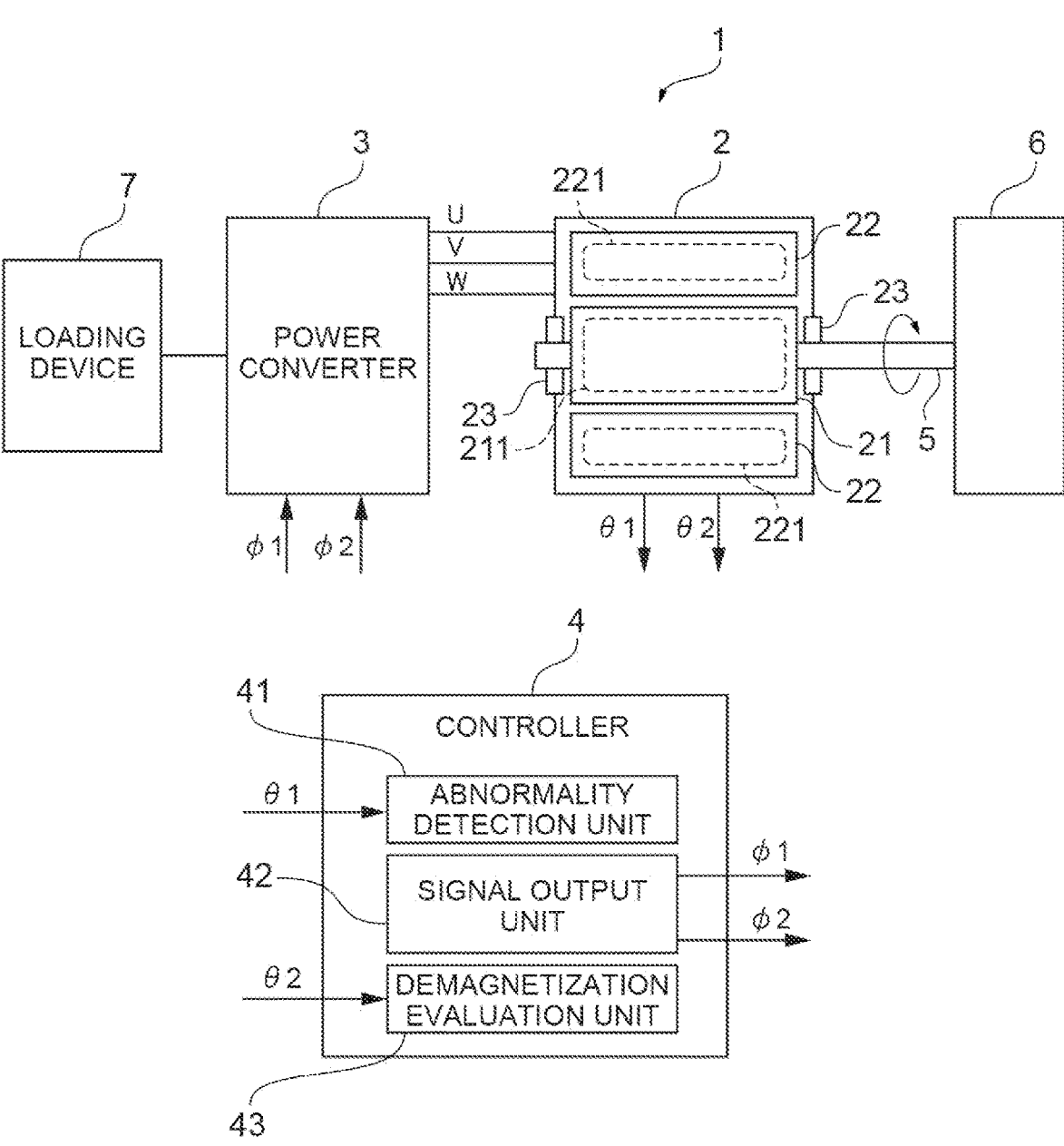
FIG. 1 is a diagram illustrating a configuration of an electric machine system of the present disclosure.

An electric machine system of the present disclosure includes an electric machine including a rotor that includes a magnet and rotates together with a shaft, and a coil fixedly disposed to surround the rotor; a power converter that outputs an output current to the coil of the electric machine; and a controller that controls the power converter. The controller includes a signal output unit that outputs a signal for controlling a mode of the output current to the power converter, and an abnormality detection unit that receives an abnormality signal indicating an abnormal situation. The signal output unit outputs a demagnetization control signal to the power converter when the abnormality detection unit receives the abnormality signal. The power converter causes a demagnetization current for a demagnetization magnetic flux for demagnetizing the magnet of the rotor to flow through the coil in response to an input of the demagnetization control signal.

The controller that has detected the abnormal situation generates a demagnetization magnetic flux for demagnetizing the magnet of the rotor by the coil of the stator by controlling the power converter. When the magnet of the rotor is demagnetized, the magnitude of the fault current generated in the coil of the stator may be reduced. The electric machine system of the present disclosure may reduce the magnitude of the fault current by controlling the power converter originally provided.

In the above-described electric machine system, the power converter may cause the demagnetization current for the demagnetization magnetic flux including a first demagnetization magnetic flux component in a direction opposite to a direction of a magnetic field generated by the magnet and synchronized with rotation of the magnet to flow through the coil in response to the input of the demagnetization control signal. According to this configuration, the first demagnetization magnetic flux component generated by the coil acts as an external magnetic flux on the magnet of the rotor. As a result, the magnet of the rotor may be demagnetized by the external magnetic flux.

In the above-described electric machine system, the power converter may perform control such that a current flowing through a coil at a position where a d-axis component is larger than a q-axis component with respect to the rotor among coils surrounding the rotor becomes larger than a current flowing through a coil at a position where the q-axis component is larger than the d-axis component in response to the input of the demagnetization control signal. This operation may also reduce the magnitude of the fault current.

In the above-described electric machine system, the power converter may cause a current not to flow through a coil at a position where a q-axis component is larger than a d-axis component.

In the above-described electric machine system, the intensity of the demagnetization magnetic flux including the first demagnetization magnetic flux component may be the intensity that causes irreversible demagnetization of the magnet of the rotor. This configuration may also reduce the magnitude of the fault current.

In the above-described electric machine system, the demagnetization control signal may cause the power converter to output, to the coil, the demagnetization current for the demagnetization magnetic flux including a second demagnetization component of an alternating current interlinked with the magnet of the rotor. According to this configuration, heat is generated in the magnet of the rotor by the second demagnetization magnetic flux component interlinked with the magnet of the rotor. As a result, the magnet of the rotor may be demagnetized by heat.

In the above-described electric machine system, the controller may include a demagnetization evaluation unit that evaluates a degree of irreversible demagnetization of the magnet of the rotor. The demagnetization evaluation unit may stop output of the demagnetization control signal from the signal output unit in a case where a degree of irreversible demagnetization of the magnet of the rotor is equal to or less than a threshold value. According to this configuration, the magnitude of the fault current may be reduced without continuing to provide a demagnetization current.

In the above-described electric machine system, the shaft may be connected to a rotating mechanism of a prime mover at a position different from a position where the rotor is provided. The shaft may receive power transmitted from the rotating mechanism to rotate the rotor. The electric machine may generate electric power due to rotation of the rotor. The electric machine system of the present disclosure may reduce the magnitude of the fault current that may be generated in the electric machine that generates electric power by controlling the power converter originally provided.

Hereinafter, an electric machine system of the present disclosure will be described in detail with reference to the accompanying drawings. In the following description, with reference to the drawings, the same reference numbers are assigned to the same components or to similar components having the same function, and overlapping description is omitted.

As shown in FIG. 1, the electric machine system 1 includes an electric machine 2, a power converter 3, and a controller 4. The electric machine 2 includes a coil and a magnet. The electric machine 2 is a generator. The electric machine 2 receives kinetic energy from an external device 6 and generates electric energy. The electric machine 2 may be an electric motor. The electric motor receives electric energy from the outside and generates kinetic energy. In the present disclosure, the electric machine 2 will be described as a generator.

Figure 2:
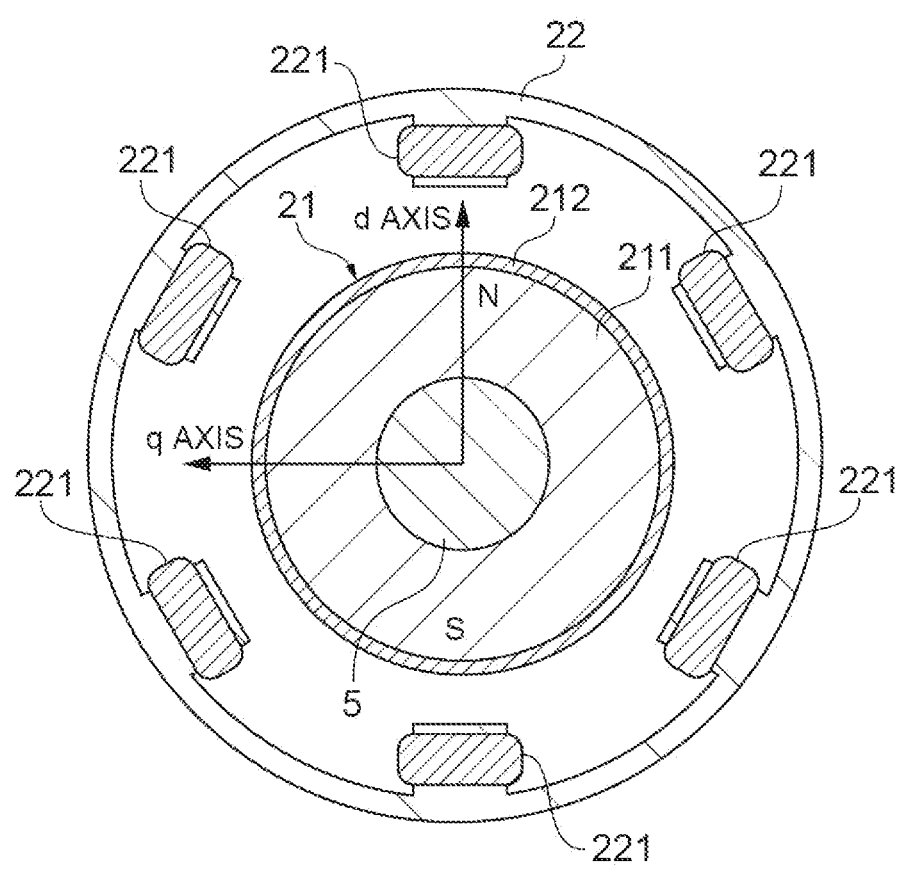
FIG. 2 is a diagram illustrating a structure of an electric machine of FIG. 1.

The electric machine 2 includes a rotor 21 and a stator 22 as main components. The rotor 21 is a cylindrical member. The rotor 21 is fixed to a shaft 5. Both ends of the shaft 5 are supported by bearings 23. The rotor 21 rotates integrally with the shaft 5. As shown in FIG. 2, the rotor 21 includes a permanent magnet 211 and an armour ring 212. Note that the armour ring 212 may be provided as necessary. Therefore, the armour ring 212 may be omitted from the rotor 21. The cylindrical permanent magnet 211 is fixed to the shaft 5. The permanent magnet 211 may be, for example, a surface permanent magnet. As a result, two axes along the radial direction may be defined in the permanent magnet 211. A line connecting an N-pole and an S-pole of the permanent magnet 211 is defined as a d-axis. A q-axis is defined as an axis orthogonal to a d-axis. The permanent magnet 211 may be covered by a cylindrical armour ring 212. The stator 22 is disposed around the rotor 21. The stator 22 is fixed to a housing or the like of the electric machine 2. The stator 22 does not move with respect to the housing or the like of the electric machine 2. The stator 22 includes a plurality of coils 221 formed by winding conductive wires around teeth.

Refer to FIG. 1 again. The power converter 3 may also convert AC power into DC power. The power converter 3 may also convert DC power into AC power. When the electric machine 2 is a generator, the power converter 3 receives electric power from the electric machine 2. The power converter 3 converts a mode of the received power. The power converter 3 outputs the converted power to a loading device 7. The power converter 3 may also perform phase control related to the phase of the three-phase alternating current. The power converter 3 may advance the phase of the three-phase alternating current. The power converter 3 may also delay the phase of the three-phase alternating current.

In an electric machine 2 exemplified as a generator, the input end of the shaft 5 is connected to the external device 6 (prime mover) as a driving source. The input end may be switchable between connection and disconnection with respect to the rotating mechanism which is the output end of the external device 6. The input end may be connected to the output end of the external device 6 not to be disconnected. When the external device 6 rotates the shaft 5, the rotor 21 rotates according to the rotation of the shaft 5. The electric machine 2 outputs three-phase AC power due to the rotation of the rotor 21.

The controller 4 controls the operation of the power converter 3. The controller 4 outputs a control signal to the power converter 3. The controller 4 is connected to the power converter 3 in a wired or wireless manner. The controller 4 is also connected to a device different from the power converter 3 in order to obtain information for outputting a control signal. For example, the controller 4 may be connected to the electric machine 2. The electric machine 2 may be provided with several sensors. The controller 4 may obtain sensor signals output from these sensors.

Specifically, the controller 4 receives an abnormality signal $\theta1$ and a current signal $\theta2$ as input signals. The controller 4 outputs an operation control signal $\varphi1$ and a demagnetization control signal $\varphi2$ as output signals.

The controller 4 is realized by a computer. The controller 4 includes one or more computers. A computer includes an arithmetic unit (processor), a main storage unit, an auxiliary storage unit, a communication control unit, an input device, and an output device. The controller 4 is configured by one or a plurality of computers configured by the hardware and software such as a program. In a case where the controller 4 includes a plurality of computers, these computers may be locally connected. The plurality of computers constituting the controller 4 may be connected via a communication network such as the Internet or an intranet. By this connection, one controller 4 is logically constructed.

The controller 4 has several functional components realized by executing a program on the above hardware. The controller 4 includes an abnormality detection unit 41, a signal output unit 42, and a demagnetization evaluation unit 43 as functional components.

The abnormality detection unit 41 receives the abnormality signal θ1. The abnormality signal θ1 indicates that the electric machine 2 is not in a normal operation state. Specifically, the abnormality signal θ1 indicates that an abnormality such as a short circuit occurs in the coil 221 of the electric machine 2. The abnormality signal θ1 may be input from, for example, a current sensor that senses a current generated by an abnormality. The abnormality signal θ1 may be input from, for example, a sensor that detects heat or light generated by a short circuit. The abnormality signal θ1 may be input from, for example, a magnetic sensor. That is, the abnormality signal θ1 may be input from various sensors. The abnormality signal θ1 may be output by a processing device that has received output signals from these sensors. The processing device receives an output signal from the sensor. The processing device executes predetermined signal processes on the received signal. As a result, the processing device generates a processed signal. The processing device may output the processed signal as the abnormality signal θ1. The abnormality signal θ1 may be a signal that is determined by human visual observation that an abnormality has occurred and is input to the abnormality detection unit 41 by a human through an input device. The controller 4 including the abnormality detection unit 41 switches the operation of the electric machine 2 to the operation when the abnormality occurs due to the input of the abnormality signal θ1.

The situation in which the abnormality signal θ1 is input to the controller 4 is not limited to the short circuit. For example, the abnormality signal θ1 may be input to the controller 4 due to a decrease in the supply amount of the refrigerant for cooling the electric machine 2. For example, the abnormality signal θ1 may be input to the controller 4 due to supply abnormality such as clogging of the refrigerant. As a result, demagnetization of the permanent magnet 211 described later may be performed.

The electric machine 2 of the present disclosure may be, for example, a generator mounted on an aircraft. The external device 6 such as an internal combustion engine (prime mover) is mounted on the aircraft in addition to the electric machine 2. The external device 6 includes a rotating body such as a turbine. The shaft 5 of the electric machine 2 is directly connected to the rotating body of the external device 6. Therefore, the rotor 21 rotates with the rotation of the rotating body of the external device 6. As a result, a current is generated in the coil 221. Even when an abnormality such as a short circuit occurs in the coil 221, it is difficult for the external device 6 such as an internal combustion engine to stop immediately. Therefore, even when an abnormality occurs, the rotational power continues to be transmitted from the external device 6 to the rotor 21 via the shaft 5.

The signal output unit 42 outputs either the operation control signal φ1 or the demagnetization control signal φ2 to the power converter 3. The signal output unit 42 outputs the demagnetization control signal φ2 in response to the abnormality detection unit 41 receiving the abnormality signal. Conversely, the signal output unit 42 outputs the operation control signal φ1 when the abnormality detection unit 41 does not receive the abnormality signal.

The operation control signal φ1 is for operating the electric machine 2 as a generator. As long as the electric machine 2 is brought into a desired operation state, the operation of the power converter 3 realized by the operation control signal φ1 is not limited at all.

For example, when the electric machine 2 is an interior permanent magnet (IPM) motor, the power converter 3 that has received the operation control signal φ1 may output a current including a d-axis component and a q-axis component. When the electric machine 2 is a surface permanent magnet (SPM) motor, the power converter 3 that has received the operation control signal φ1 may output a current including a q-axis component. The current including a q-axis component ideally means that the current output from the power converter 3 includes only a q-axis component and does not include a d-axis component. However, in practice, the current output from the power converter 3 may include a q-axis component as a main component, and may slightly include a d-axis component.

The demagnetization control signal φ2 is for causing the permanent magnet 211 of the rotor 21 to be demagnetized.

As described above, the abnormality signal θ1 has been described as indicating that an abnormality such as a short circuit has occurred. When the current (fault current) continues to be generated in the coil 221 in this abnormal state, an unintended failure may be caused. For example, when the electric machine 2 is cooled by oil, there is a concern that the oil ignites from a short circuit current. There is also a concern that wear occurs in the peripheral device due to heat generation accompanying the short circuit. When an abnormality occurs in the supply of the refrigerant, there is a concern that the peripheral device is worn due to heat generation caused by a fault current flowing through the coil 221. Therefore, measures to cope with the fault current may be taken.

When an abnormality such as a short circuit occurs, when the magnetic flux by the permanent magnet 211 of the rotor 21 rotates while interlinking with the coil 221, a reverse voltage is induced in the coil 221. As a result, a current is generated in the coil 221. That is, when the rotor 21 rotates, the reverse voltage is not induced in the coil 221 if the magnetic flux is not interlinked with the coil 221. That is, no fault current is generated in the coil 221. Therefore, the electric machine system 1 of the present disclosure demagnetizes the permanent magnet 211 of the rotor 21. When the permanent magnet 211 is demagnetized, the magnetic flux interlinked with the coil 221 decreases. As a result, the magnitude of the induced voltage and the magnitude of the fault current generated in the coil 221 are suppressed. Further, when the permanent magnet 211 is demagnetized completely, there is no magnetic flux interlinked with the coil 221. As a result, no induced voltage is generated in the coil 221, and no fault current is generated.

The demagnetization of the permanent magnet 211 may be generated by several factors. An example of using demagnetization by an external magnetic flux will be described. Another example of using demagnetization by heat will be described.

Figure 3A:
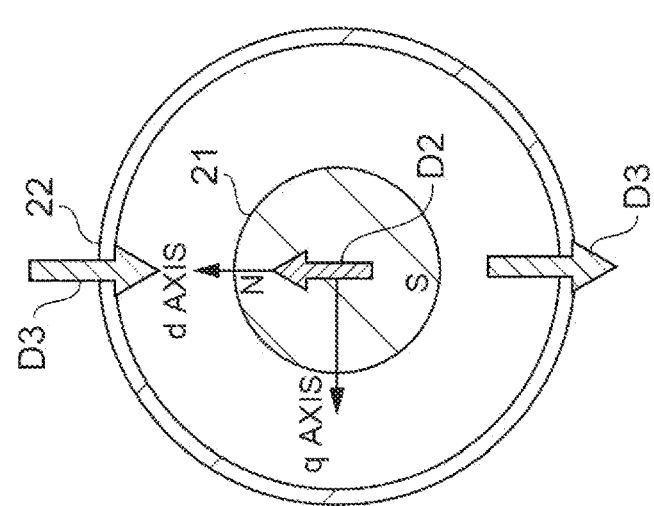
FIGS. 3A, 3B, and 3C are diagrams illustrating a demagnetization magnetic flux synchronized with rotation of a rotor.
Figure 3B:
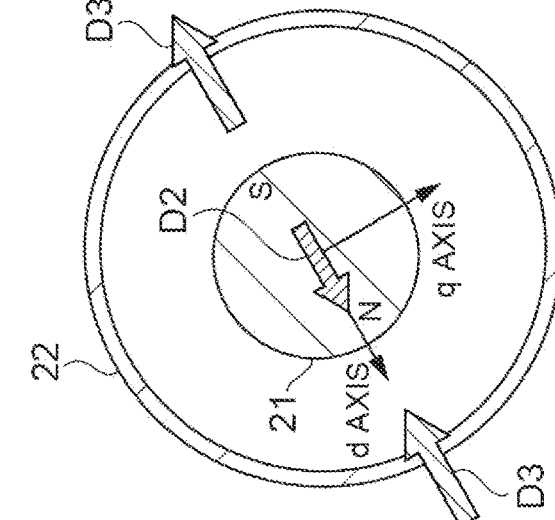
Figure 3C:
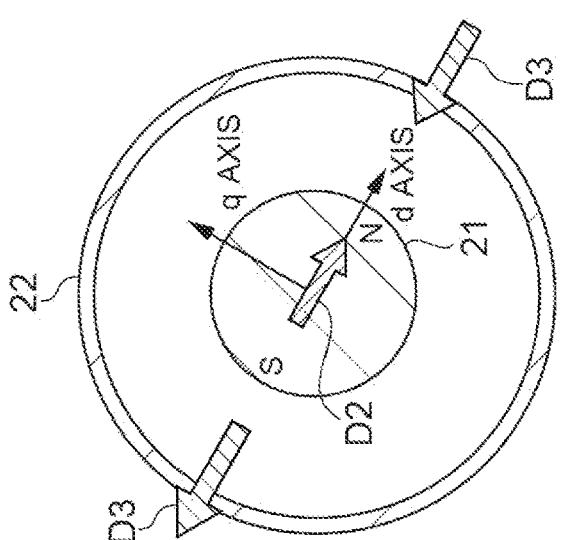

The power converter 3 that has received the demagnetization control signal φ2 outputs a demagnetization current to the stator 22. The stator 22 that has received the demagnetization current generates a demagnetization magnetic flux D3 (refer to FIG. 3). The demagnetization magnetic flux D3 includes a first demagnetization magnetic flux component in a direction opposite to the direction of a magnet magnetic flux D2 generated by the permanent magnet 211. The demagnetization current that causes the demagnetization magnetic flux D3 may also be referred to as a d-axis current. In other words, the first demagnetization magnetic flux component is along the d-axis. The demagnetization current that generates the demagnetization magnetic flux D3 may include a d-axis current as a main component. That is, the demagnetization current that generates the demagnetization magnetic flux D3 may additionally include a q-axis current. The demagnetization magnetic flux D3 is synchronized with the rotation of the permanent magnet 211. That is, the demagnetization magnetic flux D3 including the first demagnetization magnetic flux component is a rotating magnetic field. As a result, as shown in FIGS. 3A, 3B, and 3C, the direction of the demagnetization magnetic flux D3 synchronized with the rotation of the rotor 21 is always opposite to the direction of the magnet magnetic flux D2 of the permanent magnet 211. From the viewpoint of the permanent magnet 211, the permanent magnet 211 seems to always receive the magnetic flux in the direction opposite to the direction of the magnet magnetic flux D2 generated by itself. The magnitude of the demagnetization magnetic flux D3 is constant. That is, the first demagnetization magnetic flux component included in the demagnetization magnetic flux D3 is synchronized with the rotation of the rotor 21. On the other hand, basically, the magnitude of the first demagnetization magnetic flux component does not need to change with the lapse of time.

In other words, the magnitude of the first demagnetization magnetic flux component basically may or may not change with the lapse of time.

The demagnetization magnetic flux D3 may include the first demagnetization magnetic flux component. Therefore, the demagnetization magnetic flux D3 may include a magnetic flux component not along the d-axis. When the demagnetization magnetic flux D3 includes a magnetic flux component not along the d-axis, the direction of the demagnetization magnetic flux D3 in which the first demagnetization magnetic flux component and the magnetic flux component not along the d-axis are combined does not completely match the direction of the d-axis.

The permanent magnet 211 that has received the external magnetic flux generates reversible demagnetization and irreversible demagnetization according to the strength of the external magnetic flux. The demagnetization by the demagnetization magnetic flux D3 may be reversible demagnetization. The demagnetization by the demagnetization magnetic flux D3 may be irreversible demagnetization. In the case of reversible demagnetization, the magnitude of the fault current may be reduced when the demagnetization magnetic flux D3 is applied. In the case of irreversible demagnetization, when the degree of demagnetization is large, the occurrence of a fault current may be suppressed even when the application of the demagnetization magnetic flux D3 is stopped.

Figure 4:
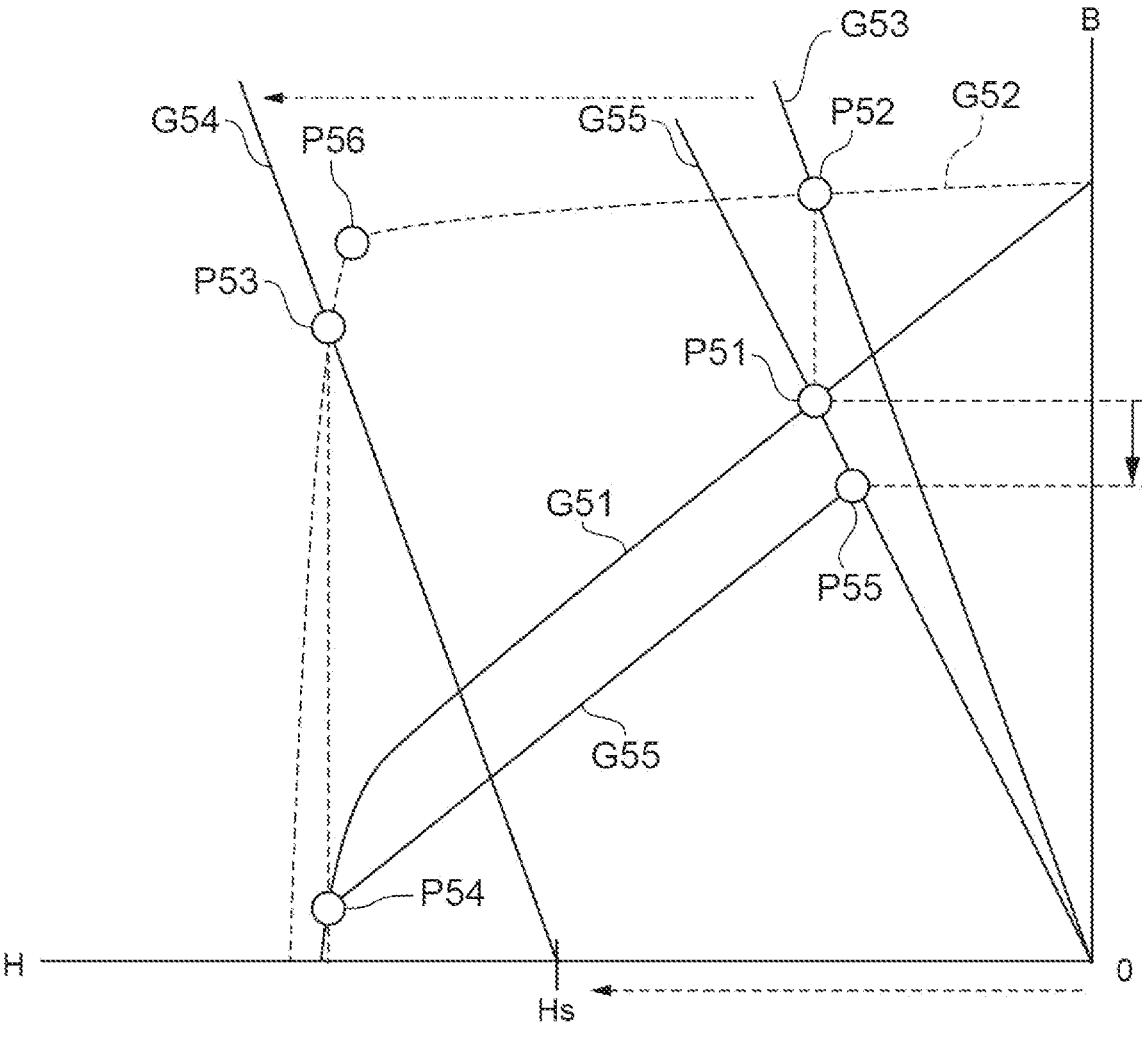
FIG. 4 is a diagram for explaining demagnetization of a magnet of the rotor by an external magnetic flux.

Whether the demagnetization magnetic flux D3 causes reversible demagnetization or the demagnetization magnetic flux D3 causes irreversible demagnetization may be understood by referring to the magnetization curve shown in FIG. 4. When the magnetization curve of the permanent magnet 211 of the rotor 21 is known, reversible demagnetization and irreversible demagnetization may be randomly selected and generated.

The horizontal axis in FIG. 4 indicates the strength of the magnetic field (H: unit A/m). The vertical axis represents the magnetic flux density (B: unit T). The graph G51 is a B-H curve (magnetic hysteresis curve) indicating the characteristics of the permanent magnet 211. The B-H curve indicates the magnetic flux density obtained by summing the external magnetic flux and the magnetic flux of the permanent magnet 211. The graph G52 is a J-H curve indicating the characteristics of the permanent magnet 211. The J-H curve indicates how much the magnitude of the magnetic flux of the permanent magnet 211 is changed by the external magnetic flux.

Now, it is assumed that the state of the permanent magnet 211 is the operating point P51 on the B-H curve (graph G51). The operating point P51 is the operating point P52 on the J-H curve (graph G52). Next, a straight line G53 connecting the operating point P52 and the original point is determined. Next, it is assumed that a demagnetization magnetic flux D3 as an external magnetic flux of which intensity is Hs is applied to the permanent magnet 211. As a result, the operating point P52 on the J-H curve (graph G52) changes to the operating point P53. The operating point P53 on the J-H curve (graph G52) is the operating point P54 on the B-H curve. When the application of the demagnetization magnetic flux D3 is stopped at the operating point P54, the magnetic field of the permanent magnet 211 tries to return to the original state following the straight line G55. The straight line G55 has a slope corresponding to the B-H curve (graph G51). Then, the state of the permanent magnet 211 may not return to the original operating point P51. The state of the permanent magnet 211 returns to the intersection point (operating point P55) of the straight line G55 connecting the original operating point P51 and the original point. The magnetic flux density of the operating point P55 is smaller than the magnetic flux density of the original operating point P51. That is, irreversible demagnetization occurs in the permanent magnet 211.

It may be seen that irreversible demagnetization occurs in the permanent magnet 211 when the demagnetization magnetic flux D3 with which the state change on the J-H curve (graph G52) exceeds the break point P56 of the J-H curve is applied to the permanent magnet 211.

The demagnetization evaluation unit 43 may evaluate the state of demagnetization of the permanent magnet 211 of the rotor 21 using, for example, the magnitude of a fault current generated in the coil 221. The demagnetization state indicates, for example, a state of the permanent magnet 211 in which a fault current smaller than an allowable current value occurs. For example, during the period in which the demagnetization control signal φ2 is output, the permanent magnet 211 is sufficiently demagnetized. Next, the output of the demagnetization control signal φ2 is stopped for a predetermined period. Then, demagnetization of the permanent magnet 211 due to the application of the demagnetization magnetic flux D3 does not occur. The magnitude of the magnetic flux generated by the permanent magnet 211 is reduced by irreversible demagnetization. In the coil 221, a fault current corresponding to the magnitude of the magnetic flux density reduced by the irreversible demagnetization is generated. When the intensity of the magnetic flux is sufficiently reduced by the irreversible demagnetization, it is not necessary to continue to apply the demagnetization magnetic flux D3. That is, when the magnitude of the fault current is acceptable, it is not necessary to continue to apply the demagnetization magnetic flux D3. Therefore, the demagnetization evaluation unit 43 stops the application of the demagnetization magnetic flux D3 for a predetermined period after applying the demagnetization magnetic flux D3. The demagnetization evaluation unit 43 obtains the magnitude of the fault current generated in a state where the application of the demagnetization magnetic flux D3 is stopped. Then, the demagnetization evaluation unit 43 selects continuation or stop of the application of the demagnetization magnetic flux D3 according to the magnitude of the fault current.

Note that the above is an example of a case where a current sensor that detects the magnitude of the current generated in the coil 221 is mounted. For example, in a case where a sensor that detects heat or light is mounted, the demagnetization evaluation unit 43 may stop the application of the demagnetization magnetic flux D3 on condition that the sensor does not detect an abnormal state and does not output an abnormality signal. Alternatively, the demagnetization evaluation unit 43 may determine whether to stop the application of the demagnetization magnetic flux D3 by using the result of measuring the magnetic flux of the interlinked rotors.

In a case where the electric machine 2 includes a sensor that directly measures the magnitude of the magnetic field of the permanent magnet 211, the demagnetization evaluation unit 43 may select continuation or stop of the application of the demagnetization magnetic flux D3 by comparing the measurement value with a threshold value. In this case, an operation of stopping the demagnetization current for a predetermined period is unnecessary.

Figure 5:
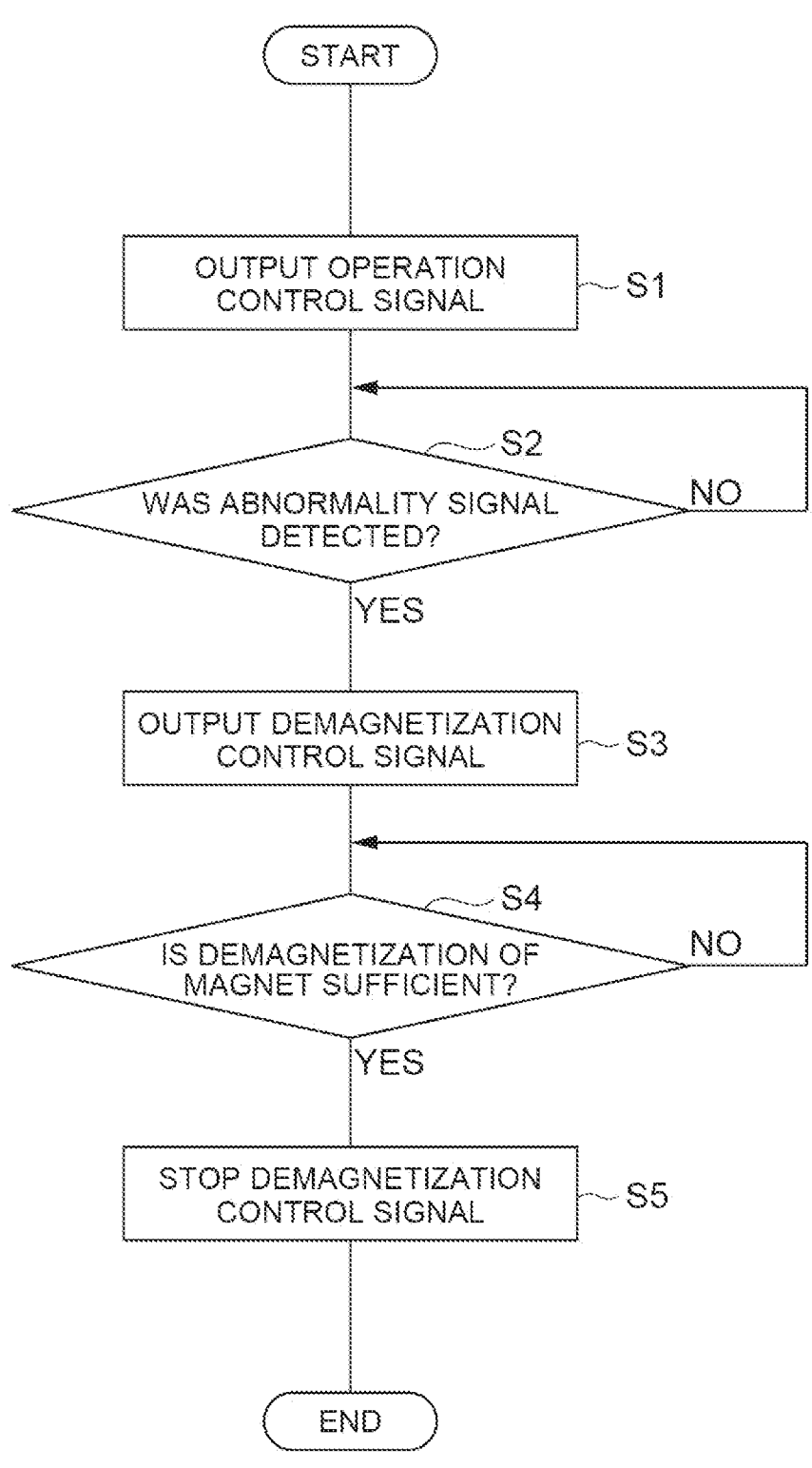
FIG. 5 is a flowchart illustrating an operation of a controller in FIG. 1.

Next, the operation of the controller 4 will be described with reference to the flowchart shown in FIG. 5. First, the signal output unit 42 outputs the operation control signal φ1 (S1). Next, the abnormality detection unit 41 determines whether the abnormality signal θ1 is input (S2). In a case where there is no input of the abnormality signal θ1 (S2: NO), the presence or absence of the input of the abnormality signal θ1 is determined again after a predetermined standby period. That is, the operation of determining the presence or absence of the input of the abnormality signal θ1 and the standby operation are repeated until the input of the abnormality signal θ1 occurs.

When the abnormality signal θ1 is input (S2: YES), the signal output unit 42 stops the output of the operation control signal φ1 and starts the output of the demagnetization control signal φ2 (S3). The intensity of the demagnetization magnetic flux D3 determined by the demagnetization control signal φ2 may be determined by a demagnetization mode (reversible demagnetization, irreversible demagnetization, or complete demagnetization). The demagnetization magnetic flux D3 is synchronized with the rotation of the rotor 21. It is difficult to directly detect the rotation of the rotor 21 in the abnormal state. Therefore, the signal output unit 42 may perform feedback control of the phase of the demagnetization magnetic flux D3 to reduce the magnitude of the fault current.

As an example, the power converter 3 that has received the input of the demagnetization control signal φ2 may perform control such that a current flowing through a coil at a position where a d-axis component is larger than a q-axis component with respect to the rotor 21 among coils 221 surrounding the rotor 21 becomes larger than a current flowing through the coil at a position where the q-axis component is larger than the d-axis component. The power converter 3 may not cause a current to flow through the coil at a position where the q-axis component is larger than the d-axis component.

In other words, the power converter 3 that has received the input of the demagnetization control signal φ2 controls the current flowing through the coil such that the d-axis component is larger than the q-axis component among the coils 221 surrounding the rotor 21. As a result, a state is realized in which the current flowing through the coil at the position where the d-axis component is larger than the q-axis component with respect to the rotor 21 is larger than the current flowing through the coil at the position where the q-axis component is larger than the d-axis component. Note that the current may not flow through the coil at a position where the q-axis component is larger than the d-axis component.

Next, the demagnetization evaluation unit 43 evaluates the degree of demagnetization of the permanent magnet 211 (S4). A specific method of the evaluation is, for example, as described above. In a case where the degree of demagnetization is not sufficient (S4: NO), the demagnetization evaluation unit 43 continues to output the demagnetization control signal φ2. In a case where the degree of demagnetization is sufficient (S4: YES), the demagnetization evaluation unit 43 stop outputting the demagnetization control signal φ2.

Hereinafter, functions and effects of the electric machine system 1 according to the example will be described.

The electric machine system 1 includes the electric machine 2 including the rotor 21 that includes the permanent magnet 211 and rotates together with the shaft 5 and the coil 221 fixedly disposed to surround the rotor 21; the power converter 3 that outputs an output current to the coil 221 of the electric machine 2; and the controller 4 that controls the power converter 3. The controller 4 includes the signal output unit 42 that outputs a signal for controlling a mode of the output current to the power converter 3; and the abnormality detection unit 41 that receives an abnormality signal θ1 indicating an abnormal situation in a case of the abnormal situation in which the generation of the fault current generated in the coil 221 by the rotation of the rotor 21 should be suppressed. When the abnormality detection unit 41 receives the abnormality signal θ1, the signal output unit 42 outputs the demagnetization control signal φ2 to the power converter 3. The demagnetization control signal φ2 causes the power converter 3 to output, to the coil 221, a demagnetization current for a demagnetization magnetic flux D3 that demagnetizes the permanent magnet 211 of the rotor 21.

The controller 4 that has detected the abnormal situation gives the demagnetization magnetic flux D3 for demagnetizing the permanent magnet 211 of the rotor 21 to the coil 221 of the stator 22 by controlling the power converter 3. When the permanent magnet 211 of the rotor 21 is demagnetized, the magnitude of the fault current generated in the coil 221 of the stator 22 may be suppressed. The electric machine system 1 may reduce the magnitude of the fault current by controlling the power converter 3 originally provided.

The electric machine system 1 of the present disclosure does not include a circuit breaker provided in an electrical output path of the electric machine 2. The electric machine system 1 is not equipped with other devices for taking measures against a fault current, such as a clutch that physically interrupts the rotation of the shaft 5. Therefore, the electric machine system 1 may reduce the weight of the electric machine system 1 as compared with a system equipped with such an interrupting device. In the electric machine system 1 of the present disclosure, the controller 4 that controls the power generation or the operation of the electric machine 2 in the normal state takes a measure against occurrence of an abnormality.

In other words, the electric machine system 1 applies a reverse magnetic field to the permanent magnet 211 of the rotor 21 by utilizing a current control function of an inverter or a converter that drives the electric machine 2 when a failure of the generator that is the electric machine 2 is detected. As a result, since the permanent magnet 211 is demagnetized partially or completely, a power generation function that generates a fault current may be reduced or eliminated. Therefore, a large fault current may be suppressed from continuing to flow.

The electric machine system 1 includes a fault protection system regardless of the presence or absence of additional components such as a circuit breaker and a clutch. Furthermore, a safety device provided separately from the electric machine 2 such as a circuit breaker may not cope with an internal short circuit failure inside the electric machine 2. However, the electric machine system 1 may also cope with an internal short circuit failure inside the electric machine 2. When additional components are not provided, an increase in the number of parts constituting the electric machine system 1 is also suppressed. As a result, the maintainability of the electric machine system 1 may also be improved.

The direction of the demagnetization magnetic flux D3 generated by the demagnetization control signal φ2 is opposite to the direction of the magnet magnetic flux D2 generated by the permanent magnet 211. The power converter 3 outputs a demagnetization current for the demagnetization magnetic flux D3 including the first demagnetization magnetic flux component synchronized with the rotation of the permanent magnet 211 to the coil 221. According to this configuration, the first demagnetization magnetic flux component generated by the coil 221 acts as an external magnetic flux on the permanent magnet 211 of the rotor 21. As a result, the magnet of the rotor 21 may be demagnetized by the external magnetic flux.

The intensity of the demagnetization magnetic flux D3 including the first demagnetization magnetic flux component is an intensity that causes irreversible demagnetization of the permanent magnet 211 of the rotor 21. This configuration may also reduce the magnitude of the fault current.

The controller 4 includes the demagnetization evaluation unit 43 that evaluates the degree of irreversible demagnetization of the permanent magnet 211 of the rotor 21. When the degree of irreversible demagnetization of the permanent magnet 211 of the rotor 21 is equal to or less than the threshold value, the demagnetization evaluation unit 43 stops the output of the demagnetization control signal φ2 from the signal output unit 42. According to this configuration, the fault current may be suppressed without continuing to provide the demagnetization current.

The electric machine system 1 according to another example will be described. The electric machine system 1 of this example is different from that of the example described earlier in the way adopted for demagnetization. Therefore, since physical components of the electric machine system 1 are the same as those in the example described earlier, detailed description thereof will be omitted. The electric machine system 1 of the example described below is different from that of the example described earlier in the operation of the power converter 3 according to the demagnetization control signal φ2 generated by the signal output unit 42 of the controller 4 and the operation of the stator 22. Specifically, the controller 4 of the example described earlier demagnetizes the permanent magnet 211 of the rotor 21 by the external magnetic flux. The controller 4 of the example described below demagnetizes the permanent magnet 211 of the rotor 21 by heat. That is, the demagnetization control signal φ2 output from the controller 4 of the example described below generates a magnetic field that heats the permanent magnet 211 of the rotor 21.

Figures 6A, 6B, 6C, 6D, 6E, 6F:
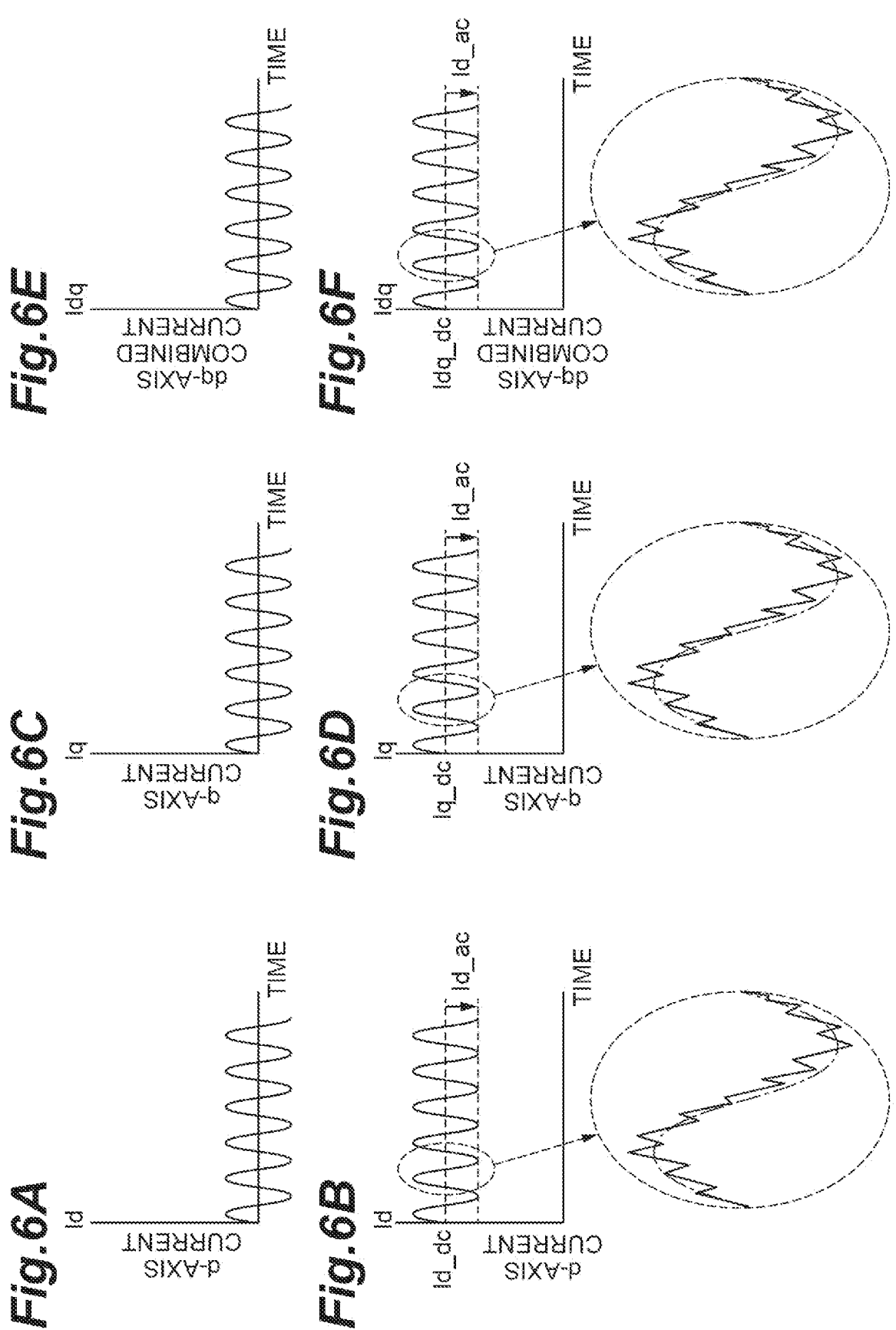
FIGS. 6A and 6B are diagrams illustrating a current provided from a power converter to the electric machine in the electric machine system.
FIGS. 6C, 6D, 6E, and 6F are diagrams illustrating modification examples of the current provided from the power converter to the electric machine in the electric machine system.

FIG. 6A illustrates a demagnetization current output to the stator 22 by the power converter 3 that has received the demagnetization control signal φ2. As shown in FIG. 6A, the demagnetization current is an alternating current. The demagnetization current shown in FIG. 6A includes an AC component of which the magnitude changes to a plus side and a minus side across zero. The demagnetization current does not include a DC component (bias component) that does not change with the lapse of time. As a result, demagnetization magnetic flux D3 is also an alternating magnetic field in which the magnitude of the magnetic field changes with the lapse of time. By applying an alternating magnetic field to the rotor 21, eddy currents may be intentionally generated in the rotor 21. This eddy current causes the magnet to generate heat.

As shown in FIG. 6B, the demagnetization current may include an AC component. The demagnetization current may include a DC component in addition to an AC component. When the demagnetization current includes an AC component and a DC component, the switching frequency may be lowered. As a result, an effect of increasing the eddy current based on the high-frequency ripple current (refer to the enlarged portion of FIG. 6B) may also be obtained.

The technique for lowering the switching frequency is not limited to the example shown in FIG. 6B. The technique for lowering the switching frequency is also applicable to the example of FIG. 6A. Furthermore, the technique for lowering the switching frequency may also be applied to exemplary operations shown in FIGS. 6C, 6D, 6E, and 6F described later. According to the technique for lowering the switching frequency, since a high-frequency component is included, the heating effect may be enhanced.

FIG. 8A also illustrates the demagnetization current output to the stator 22 by the power converter 3 that has received the demagnetization control signal φ2. As shown in FIG. 8A, the demagnetization current is an alternating current. The demagnetization current shown in FIG. 8A includes an AC component of which the magnitude changes to a plus side and a minus side across zero. The demagnetization current shown in FIG. 8A does not include a DC component (bias component) that does not change with the lapse of time. As a result, demagnetization magnetic flux D3 is also an alternating magnetic field in which the magnitude of the magnetic field changes with the lapse of time. By applying an alternating magnetic field to the rotor 21, eddy currents may be intentionally generated in the rotor 21. This eddy current causes the magnet to generate heat.

As shown in FIG. 8B, the demagnetization current may include an AC component. The demagnetization current may include a DC component in addition to an AC component. In particular, in FIG. 8B, the sign of the combined current of the AC component and the DC component does not vary with time. That is, the sign of the combined current may be always positive or always negative.

In the example shown in FIGS. 8A and 8B, the switching frequency may be lowered. As a result, an effect of increasing the eddy current based on the high-frequency ripple current may also be obtained. The high-frequency ripple current is shown in an enlarged portion of FIGS. 8A and 8B as an example.

The technique for lowering the switching frequency is not limited to the example illustrated in FIGS. 8A and 8B. The technique for lowering the switching frequency may also be applied to exemplary operations shown in FIGS. 8C, 8D, 8E, and 8F described later. According to the technique for lowering the switching frequency, since a high-frequency component is included, the heating effect may be enhanced.

In the demagnetization by the external magnetic flux, reversible demagnetization and irreversible demagnetization may be intentionally selected when the magnetization characteristics of the permanent magnet 211 as shown in FIG. 4 are known. Similarly, the reversible demagnetization and the irreversible demagnetization may be intentionally selected when the magnetization characteristics of the permanent magnet 211 are known.

Figure 7:
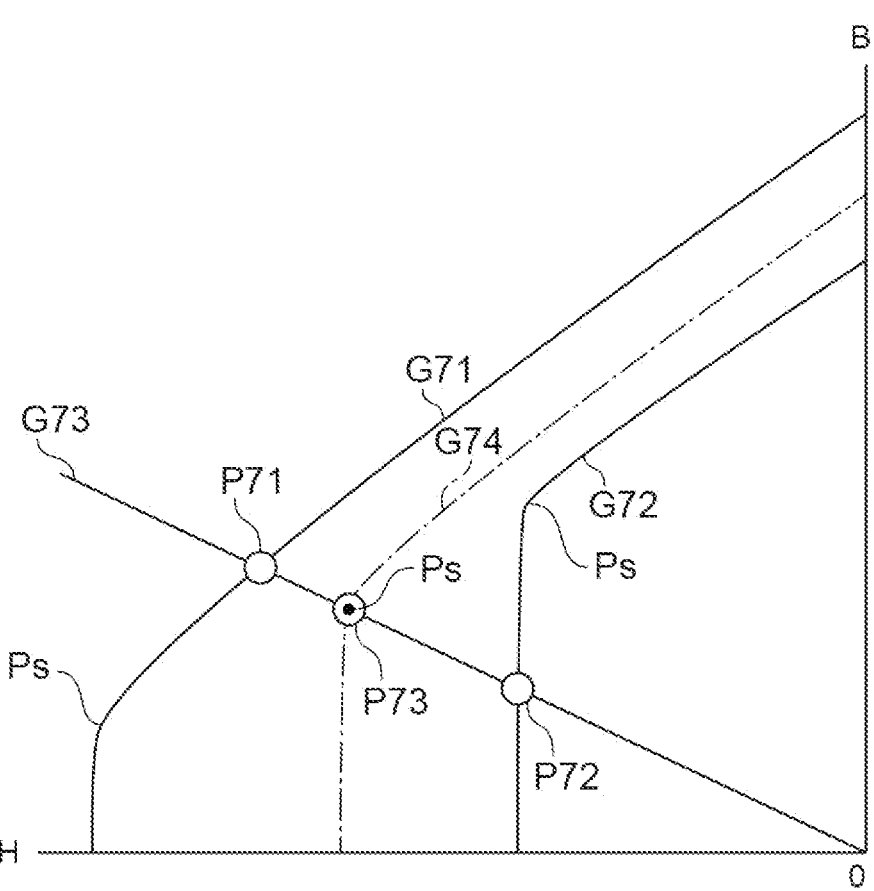
FIG. 7 is a diagram for explaining demagnetization of a magnet of the rotor by heat.

FIG. 7 illustrates a B-H curve indicating the magnetization characteristics of the permanent magnet 211. A B-H curve shown in the graph G71 indicates the magnetization characteristics of the permanent magnet 211 when the temperature of the permanent magnet 211 is room temperature. A B-H curve shown in the graph G72 indicates the magnetization characteristics of the permanent magnet 211 when the temperature of the permanent magnet 211 is high. As shown in the graphs G71 and G72, the magnetization characteristics of the permanent magnet 211 changes depending on the temperature.

It is assumed that the temperature of the permanent magnet 211 is room temperature and in a state of the operating point P71. Next, it is assumed that as a result of the permanent magnet 211 being heated, the magnetization characteristics of the permanent magnet 211 has changed to the characteristics shown in the graph G72. The operating point P72 is determined by the temperature coefficient of the residual magnetic flux density (Br) of the permanent magnet 211. Now, the straight line G73 may be defined by the temperature coefficient of the residual magnetic flux density (Br). The permanent magnet 211 operates in the state shown on the straight line G73 according to the temperature. That is, the operating point P72 of the heated permanent magnet 211 is an intersection of the B-H curve which is the graph G72 and the straight line G73. Looking back on the description of demagnetization in the example of the external magnetic flux, when the operating point exceeds the break point Ps in the B-H curve, irreversible demagnetization occurs. Similarly, in a case where the permanent magnet 211 is heated until the characteristics shown in the graph G72 are obtained, irreversible demagnetization occurs. For example, it is assumed that the temperature is higher than room temperature and is the temperature indicated by the B-H curve of the graph G74. In this case, the operating point P73 does not exceed the break point. Therefore, in this case, the magnetization is reversible demagnetization.

The degree of heating of the permanent magnet 211 may be controlled by, for example, the amplitude and frequency of the AC component. The degree of heating of the permanent magnet 211 may also be adjusted by controlling the switching speed and changing the magnitude of ripples.

The demagnetization control signal φ2 causes the power converter 3 to output, to the coil 221, a demagnetization current for a demagnetization magnetic flux including the second demagnetization component of an alternating current interlinked with the permanent magnet 211 of the rotor 21. According to this configuration, heat is generated in the permanent magnet 211 of the rotor 21 by the second demagnetization magnetic flux component interlinked with the permanent magnet 211 of the rotor 21. As a result, the permanent magnet 211 of the rotor 21 may be demagnetized by heat.

The electric machine system of the present disclosure has been described above in detail based on the example. However, the electric machine system of the present disclosure is not limited to the above contents. The electric machine system of the present disclosure may be variously modified without departing from the gist thereof. It is to be understood that not all aspects, advantages and features described herein may necessarily be achieved by, or included in, any one particular example. Indeed, having described and illustrated various examples herein, it should be apparent that other examples may be modified in arrangement and detail.

As shown in FIGS. 6A and 6B, the demagnetization current has been described as a d-axis current. For example, the demagnetization current may be a q-axis current as shown in FIG. 6C. The demagnetization current, which is a q-axis current, may include only an AC component as shown in FIG. 6C. The demagnetization current, which is a q-axis current, may include an AC component and a DC component as shown in FIG. 6D.

As shown in FIG. 6E, the demagnetization current may be a combined current of a d-axis current component and a q-axis current component. Also in this case, similarly to Modification Example 1, the demagnetization current which is a dq-axis combined current may include only an AC component as shown in FIG. 6E. The demagnetization current, which is the dq-axis combined current, may include an AC component and a DC component as shown in FIG. 6F.

[Supplementary Note]

The present disclosure includes the following configurations.

The electric machine system of the present disclosure is [1] "an electric machine system including: an electric machine including a rotor that includes a magnet and rotates together with a shaft, and a coil fixedly disposed to surround the rotor; a power converter configured to output an output current to the coil of the electric machine; and a controller that controls the power converter, in which the controller includes a signal output unit configured to output a signal for controlling a mode of the output current to the power converter, and an abnormality detection unit configured to receive an abnormality signal indicating an abnormal situation, the signal output unit outputs a demagnetization control signal to the power converter when the abnormality detection unit receives the abnormality signal, and the power converter causes a demagnetization current for a demagnetization magnetic flux for demagnetizing the magnet of the rotor to flow through the coil in response to an input of the demagnetization control signal".

The electric machine system of the present disclosure is [2] "the electric machine system according to the above-described [1], in which the power converter causes the demagnetization current for the demagnetization magnetic flux including a first demagnetization magnetic flux component in a direction opposite to a direction of a magnetic field generated by the magnet and synchronized with rotation of the magnet to flow through the coil in response to the input of the demagnetization control signal".

The electric machine system of the present disclosure is [3] "the electric machine system according to the above-described [2], in which the power converter performs control such that a current flowing through a coil at a position where a d-axis component is larger than a q-axis component with respect to the rotor among coils surrounding the rotor becomes larger than a current flowing through a coil at a position where the q-axis component is larger than the d-axis component in response to the input of the demagnetization control signal".

The electric machine system of the present disclosure is [4] "the electric machine system according to the above-described [3], in which the power converter causes a current not to flow through a coil at a position where a q-axis component is larger than a d-axis component".

The electric machine system of the present disclosure is [5] "the electric machine system according to any one of the above-described [2] to [4], in which the intensity of the demagnetization magnetic flux including the first demagnetization magnetic flux component is an intensity that causes irreversible demagnetization of the magnet of the rotor".

The electric machine system of the present disclosure is [6] "the electric machine system according to any one of the above-described [1] to [5], in which the demagnetization control signal causes the power converter to output, to the coil, the demagnetization current for the demagnetization magnetic flux including a second demagnetization component of an alternating current interlinked with the magnet of the rotor".

The electric machine system of the present disclosure is [7] "the electric machine system according to any one of the above-described [1] to [6], in which the controller includes a demagnetization evaluation unit that evaluates a degree of irreversible demagnetization of the magnet of the rotor, and the demagnetization evaluation unit stops output of the demagnetization control signal from the signal output unit in a case where a degree of irreversible demagnetization of the magnet of the rotor is equal to or less than a threshold value".

The electric machine system of the present disclosure is [8] "the electric machine system according to any one of the above-described [1] to [7], in which the shaft is connected to a rotating mechanism of a prime mover at a position different from a position where the rotor is provided, the shaft receives power transmitted from the rotating mechanism to rotate the rotor, and the electric machine generates electric power due to rotation of the rotor.

The invention claimed is:

1. An electric machine system comprising:
an electric machine comprising:
a rotor that comprises a magnet and rotates together with a shaft; and
a coil fixedly disposed to surround the rotor;
a power converter configured to output an output current to the coil of the electric machine; and
at least one processor configured to:
receive an abnormality signal indicating an abnormal situation, and
output a demagnetization control signal to the power converter in response to receiving the abnormality signal,
wherein the power converter is configured to output a demagnetization current to the coil, in response to receiving the demagnetization control signal from the processor, and the demagnetization current flows through the coil and demagnetizes the magnet of the rotor, so as to reduce a magnitude of a fault current,
wherein the demagnetization current causes an external magnetic flux to be applied to the magnet,
wherein the demagnetization current includes a first demagnetization magnetic flux component as the external magnetic flux, and
wherein the first demagnetization magnetic flux component has a direction opposite to a direction of an original magnetic field generated by the magnet and is synchronized with rotation of the magnet.

2. The electric machine system according to claim 1,
wherein the electric machine further comprises a heat sensor that senses a heat generated by a short circuit occurred in the coil as the abnormal situation.

3. The electric machine system according to claim 1,
wherein the abnormality signal indicates a decrease in a supply amount of a refrigerant for cooling the electric machine as the abnormal situation.

4. The electric machine system according to claim 1,
wherein a magnitude of the first demagnetization magnetic flux component is constant.

5. The electric machine system according to claim 1,
wherein an intensity of the first demagnetization magnetic flux component is an intensity that causes an irreversible demagnetization of the magnet.

6. The electric machine system according to claim 5,
wherein the processor is further configured to evaluate a degree of the irreversible demagnetization of the magnet, and
wherein the processor is further configured to stop output of the demagnetization control signal in a case where the degree of irreversible demagnetization of the magnet is equal to or less than a threshold value.

7. The electric machine system according to claim 1,
wherein the shaft is connected to a rotating mechanism of a prime mover at a position different from a position where the rotor is provided,
wherein the shaft receives power transmitted from the rotating mechanism to rotate the rotor, and
wherein the electric machine generates electric power due to rotation of the rotor.

8. The electric machine system according to claim 1,
wherein a generator forms the electric machine.

9. The electric machine system according to claim 1,
wherein an electric motor forms the electric machine.

10. An electric machine system comprising:
an electric machine comprising:
a rotor that comprises a magnet and rotates together with a shaft; and
a coil fixedly disposed to surround the rotor;
a power converter configured to output an output current to the coil of the electric machine; and
at least one processor configured to:
receive an abnormality signal indicating an abnormal situation, and
output a demagnetization control signal to the power converter in response to receiving the abnormality signal,
wherein the power converter is configured to output a demagnetization current to the coil, in response to receiving the demagnetization control signal from the processor, and the demagnetization current flows through the coil and demagnetizes the magnet of the rotor, so as to reduce a magnitude of a fault current,
wherein the demagnetization current causes an external magnetic flux to be applied to the magnet, and
wherein the power converter is configured to perform a control such that a demagnetization current flowing through a coil at a position where a d-axis component is larger than a q-axis component becomes larger than a demagnetization current flowing through a coil at a position where the q-axis component is larger than the d-axis component, in response to the input of the demagnetization control signal from the processor.

11. The electric machine system according to claim 10,
wherein the power converter causes the demagnetization current not to flow through the coil at the position where the q-axis component is larger than the d-axis component.

12. An electric machine system comprising:
a power converter; and
at least one processor configured to:
receive an abnormality signal indicating an abnormal situation, and output a demagnetization control signal to the power converter in response to receiving the abnormality signal, wherein the power converter is configured to output a demagnetization current for to a coil of an electric machine, in response to receiving the demagnetization control signal from the processor, and the demagnetization current flows through the coil and demagnetizes the magnet of the rotor, so as to reduce a magnitude of a fault current, wherein the demagnetization current causes an external magnetic flux to be applied to the magnet, and wherein a surface permanent magnet forms the magnet having a d-axis along a line connecting an N-pole and an S-pole of the surface permanent magnet and a q-axis which is orthogonal to the d-axis.

*    *    *    *    *